United States Patent [19]

Fong et al.

[11] Patent Number: 5,260,386
[45] Date of Patent: Nov. 9, 1993

[54] SYNTHESIS OF TAGGED POLYMERS BY POST-POLYMERIZATION (TRANS) AMIDATION REACTION

[75] Inventors: Dodd W. Fong, Naperville; John E. Hoots, St. Charles, both of Ill.

[73] Assignee: Nalco Chemical Company, Naperville, Ill.

[21] Appl. No.: 50,592

[22] Filed: Apr. 22, 1993

Related U.S. Application Data

[60] Continuation-in-part of Ser. No. 875,433, Apr. 29, 1992, Pat. No. 5,216,086, which is a division of Ser. No. 569,865, Aug. 20, 1990, Pat. No. 5,128,419.

[51] Int. Cl.$^5$ ................................................. C08F 8/40
[52] U.S. Cl. .................................. 525/340; 525/327.6; 525/328.5; 525/329.9; 525/330.4; 525/351; 525/353; 525/377; 525/379
[58] Field of Search ............... 525/340, 351, 353, 377, 525/379

[56] References Cited

U.S. PATENT DOCUMENTS 4,963,625 10/1990 Gowan, Jr. ................... 525/329.9
5,030,697 7/1991 Hugl et al. .................... 525/326.9

Primary Examiner—Bernard Lipman
Attorney, Agent, or Firm—Joan I. Norek; Robert A. Miller; Joseph B. Barrett

[57] ABSTRACT

A polymer having pendant fluorescent groups is prepared by (trans)amidation of a preformed polymer by reaction with an amine-containing organic fluorescent composition of the Formula III $$H-N-R_5 \atop R_6 \qquad \text{Formula III}$$

wherein one of $R_5$ and $R^6$ may be hydrogen, and wherein within at least one of $R_5$ and $R_6$, or within $R_5$ and $R_6$ taken together, is an organic fluorescent group wherein the organic fluorescent group includes a polynuclear aromatic ring system. A degree of (trans)amidation derivatization of the polymer is accomplished by heating the admixture of polymer and fluorescent agent for a sufficient period of time. A second amine-containing post-polymerization derivatization agent other than the organic fluorescent composition of Formula III is added to the admixture or to at least a portion of the reaction product of the (trans)amidation derivatization, and is heated therewith to accomplish a degree of sequential or simultaneous post-polymerization derivatization with the second amine-containing post-polymerization derivatization agent.

20 Claims, No Drawings

SYNTHESIS OF TAGGED POLYMERS BY POST-POLYMERIZATION (TRANS) AMIDATION REACTION

The present application is a continuation-in-part of copending application Ser. No. 07/875,433, filed on Apr. 29, 1992, now U.S. Pat. No. 5,216,086, which copending application is a division application of application Ser. No. 07/569,865, filed on Aug. 20, 1990, which issued on Jul. 7, 1992, as U.S. Pat. No. 5,128,419.

TECHNICAL FIELD OF THE INVENTION

The present invention is in the technical field of polymer synthesis by the method of post-polymerization derivatization and polymers prepared thereby. More particularly, the present invention is in the technical field of synthesizing polymers having pendant fluorescent groups and polymers prepared thereby.

BACKGROUND OF THE INVENTION

In many fields that employ polymers it may be desirable to tag or mark such polymers to facilitate monitoring thereof. By the term "monitoring" is meant herein any type of tracing or tracking to determine the location or route of the polymers, and any type of determination of the concentration of the polymer at any given site, including singular or intermittent or continuous monitoring. For instance, it may be desirable to monitor water treatment polymers in water systems, particularly industrial water systems, or to monitor polymers that may be present in waste fluids before disposal, particularly industrial waste fluids, or to monitor the polymer used for down-hole oil well applications, particularly the route taken after introduction down-hole, or to monitor polymers that may be present in fluids used to wash a manufactured product, for instance a polymer-coated product, to determine the amount of polymer washed or leached therefrom. By fluids or liquids as used herein generally is meant aqueous, non-aqueous, and mixed aqueous/non-aqueous fluid systems. As seen from the above list of possible applications of polymer monitoring, the purpose of such monitoring may be to trace or track or determine the level of the polymer itself, or to trace or track or determine the level of some substance in association with the polymer, or to determine some property of the polymer or substance in association with the polymer, for instance its leachability.

Conventional techniques for monitoring polymers are generally time-consuming and labor intensive, and often require the use of bulky and/or costly equipment. Most conventional polymer analysis techniques require the preparation of calibration curves for each type of polymer employed, which is time-consuming and laborious, particularly when a large variety of polymer chemistries are being employed, and the originally prepared calibration curves lose their accuracy if the polymer structures change, for instance an acrylic acid ester mer unit being hydrolyzed to an acrylic acid mer unit. Direct methods wherein the level of functional groups present in a polymer is determined analytically are generally not practical for industrial use, particularly when it is desired to monitor a polymer on a frequent or continuous basis, or when rapid monitoring results are needed. Indirect methods of polymer monitoring may provide more rapid results using simpler techniques, but in many instances faster and/or more accurate determinations are desirable.

Polymers tagged with pendant fluorescent groups are generally easily monitored, even when present at low concentrations. Highly fluorescent molecules, that is molecules which have a fluorescent quantum efficiency, or fluorescent quantum yield, within the range of from about 0.1 to about 1.0, and a light absorbance molar extinction coefficient of at least 1,000, are typically detectable at concentration ranges of parts per million ("ppm") to parts per billion ("ppb") or even less. The incorporation of such a highly fluorescent species into a polymer in the amount of one weight percent (based on polymer actives) will permit the detection of such polymer at polymer concentration levels down to 0.1 ppm or less, provided the fluorescent quantum yield and the light absorbance molar extinction coefficient of the fluorescent tagging agent are not significantly adversely affected by its attachment to the polymer.

It would be desirable to provide a method of tagging polymers with pendant fluorescent groups by derivatization of a pre-existing polymer and hence avoid problems such as potential side-reactions or other complications that may arise in attempts to incorporate fluorescent monomer units into the polymer during synthesis of such polymer. It would be desirable to provide a method of tagging pre-existing polymers with pendant fluorescent groups so as to permit polymers that are commercially available without such tagging to be converted to tagged polymers. It would be desirable to provide such a method that minimizes the reaction steps required and minimizes the time required for the reaction. It would be desirable to provide such a method that proceeds under reaction conditions that do not have a deleterious effect on the polymer structure. It would be desirable to provide such a method that can utilize, as the agent providing the pendant fluorescent groups, inexpensive commercially available compositions. It would be desirable to provide such a method that can employ a wide variety of fluorescent derivatizing agents and hence provide tagged polymers having a wide variety of fluorescent spectra, particularly when it is desired to monitor polymers individually in situations where a plurality of polymers are present. For instance, such polymers may be tagged with distinguishable fluorescent derivatizing agents and hence each polymer may be individually monitored, or the derivatizing agent(s) may be selected so as to monitor the polymer(s) even in the presence of other fluorescent material(s). It would be desirable to provide such a method wherein a reasonably high concentration of polymer starting material may be utilized. It would be desirable to provide such a method that is not dependent on the presence of a single type of pendant group being present on the starting material polymer. It would be desirable to provide such a method that can proceed simultaneously with other post-polymerization derivatizing reactions. It would be desirable to provide polymers tagged with fluorescent groups produced by such a method. It would be desirable to provide such polymers having diverse fluorescent tags. It would be desirable to provide such polymers derivatized at reasonable cost. It would be desirable to provide such polymers having fluorescent spectra distinguishable from the spectra of the fluorescent derivatizing agents employed. These and other objects are provided by the present invention which is described in more detail below.

DISCLOSURE OF THE INVENTION

The present invention provides a method of preparing polymers having pendant fluorescent groups by (trans)amidation derivatization of pre-existing polymers by reaction between certain pendant groups on such polymers and certain organic fluorescent derivatizing agents. More specifically, the pendant polymer groups derivatized by the (trans)amidation reaction are carbonyl-type groups of the Formula I:

Formula I wherein R is —OR' or —NH$_2$, wherein R' is hydrogen or a substituent other than hydrogen, and salts thereof, and mixtures and combinations thereof. By salts is meant herein alkali metal salts, alkaline earth metal salts, amine salts, alkanol amine salts, and the like. By "substituent" is meant herein a single or multivalent group other than hydrogen covalently bonded to a carbon of an organic molecule.

The pendant polymer group derivatized by the (trans)amidation reaction may be contained in a polymer unit or mer unit (a portion of the polymer containing two adjacent backbone carbons) having the structure of Formula II:

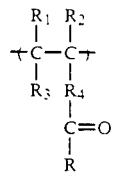

Formula II wherein R$_4$ is C$_n$H$_{2n}$ wherein n is zero or an integer from 1 to about 10, R$_1$, R$_2$ and R$_3$ are independently hydrogen or a substituent other than hydrogen, and R is as defined above for Formula I, and salts thereof, and mixtures or combinations thereof.

The organic fluorescent derivatizing agent is an organic fluorescent molecule that contains an amine group, preferably a primary amine group. Such an agent may be represented by the Formula III:

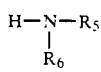

Formula III wherein one of R$_5$ and R$_6$ may be, and preferably is, hydrogen, and within at least one of R$_5$ and R$_6$ or within and together, is an organic fluorescent group. The (trans)amidation derivatization reaction proceeds as follows:

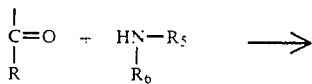

Formula I    Formula III

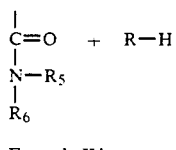

Formula IV wherein the structure designated Formula IV above is a (trans)amidation derivatized pendant group on the polymer. As seen from Formula IV, the derivatized pendant polymer group is a pendant N-substituted amide group having a fluorescent group within at least one of R$_5$ and R$_6$ or within R$_5$ and R$_6$ taken together. This reaction is an amidation reaction when R is —OR' and a transamidation reaction when R is —NH$_2$, and hence the term "(trans)amidation" is used herein to specify either or both forms of the reaction.

PREFERRED EMBODIMENTS OF THE INVENTION

The (trans)amidation reaction is conducted in an aqueous reaction mixture generally, employing a starting material polymer that is water soluble at the concentration used, or is introduced as held within a latex, and in addition, employing an organic fluorescent derivatizing agent that is water soluble. The reaction mixture preferably is fluid. The product polymer resulting from the (trans)amidation derivatization reaction may possibly have its solubility characteristics so altered by the incorporation of the fluorescent group that it precipitates, or partially precipitates, from the reaction mixture.

The (trans)amidation reaction is conducted at elevated temperatures, and generally under pressures that exceed atmospheric pressure. In general it is desirable not to degrade the polymer to any significant extent during the derivatization reaction and generally a reaction in a closed vessel at a temperature of from about 120° to about 200° C., for a time period of from about 1 to about 8 hours, may be suitable, the presssure being dependent in part on the temperature. In preferred embodiment the reaction is conducted at from about 130° to about 155° C. In preferred embodiment the reaction is conducted over a time period of from about 1 to about 6 hours. Nonetheless, the reaction may proceed somewhat at temperatures as low as 75° or 80° C.

The derivatization reaction may be conducted with air present in the reaction vessel at times, but it may be desirable to exclude oxygen, for instances by purging the reaction vessel with nitrogen gas prior to the reaction. When it is desirable to reduce the pressure that would otherwise be attained by reaction at a given temperature, the reaction vessel may have its internal pressure reduced prior to closing and raising the temperature for the transamidation reaction.

The derivatization reaction may be conducted under varying pH conditions, for instance, at a pH of from about 3 to about 10 or possibly 11, but it is preferable, particularly to avoid hydrolysis or polymer degradation, to conduct the reaction at a moderate pH. Moreover, one of the advantages of the present invention is that the derivatization reaction proceeds at a moderate pH, which preferably is a pH of from about 5 to about 7.

Another of the advantages of the present invention is that, for a suitable polymer starting material, the derivatization reaction may be conducted employing a high concentration of starting material polymer, which is particularly advantageous for the commercial use of the derivatization reaction. Commercially, a starting material polymer concentration of at least about 10 weight percent is desirable, but if a low water solubility polymer is used, a lower concentration may be necessary to maintain a fluid reaction mixture. For water soluble polymers with weight average molecular weights of up to 50,000 to 200,000, or up to 50,000 to 100,000, starting material polymer concentrations of from about 10 to about 45 weight percent are desirable, and from about 30 to about 45 weight percent are very preferred.

As noted above, the starting material polymer may be a polymer containing polymer units of the Formula II above. Such polymer units may be derived from acrylic acid, wherein the n of $R_4$ is zero, each of $R_1$, $R_2$ and $R_3$ are hydrogen, and R is —OH. Such polymer units may be derived from acrylamide, similar to acrylic acid except R is —$NH_2$. Such units may be methacrylic acid or methacrylamide wherein $R_2$ is methyl, or for instance itaconic acid wherein $R_2$ is —$CO_2H$, $R_4$ is —$CH_2$—, and R is —OH. Such polymer units may contain carboxylic acid esters, such as methylacrylate wherein R is —OR' and R' is methyl. It is believed that existing N-substituted amide pendant groups do not to any significant extent participate in the (trans)amidation reaction.

The presence of nonparticipating pendant groups on the starting material polymer generally will not interfere with the (trans)amidation reaction, and hence the present invention may be used to tag a wide variety of pre-existing polymers.

Only a very low level of fluorescent groups need to be incorporated into a polymer to provide fluorescent detectibility to the polymer. When highly fluorescent groups are employed, the fluorescent derivatizing agent may be required in amounts as low as 0.01 weight percent based on total weight of the polymer, and generally an amount of about 1 weight percent based on total weight of polymer should be sufficient. While the maximum amount of fluorescent groups that may be incorporated into the polymer is limited only by the reactive sites available for a given polymer, there is generally no practical purpose for excessively tagging a polymer.

Since it is believed that the derivatization reaction does not, under the preferred and advantageous reaction conditions of the invention, proceed to the exhaustion of all fluorescent derivatizing agent and the exhaustion of all reactive sites on the polymer, it is preferred to employ a polymer having more reactive sites (pendant groups of the Formula I) than required for exhaustion of the fluorescent derivatizing agent used. Hence while a 1 to 1 mole ratio of polymer reactive sites to fluorescent derivatizing agent is possible, and in fact less polymer reactive sites could reasonably be employed, it is desirable to have an excess of polymer reactive sites, and a soluble polymer of any significant molecule weight will have such an excess generally.

In preferred embodiment, the starting material polymers of the present invention are water soluble polymers having molecular weights of from about 2,000 to about 100,000, and more preferably to about 50,000. In further preferred embodiment, the starting material polymers of the present invention are water soluble polymers having at least 10 mole percent, and more preferably at least 30 or 50 mole percent, of mer units of the Formula II. In ever more preferred embodiment, such polymers have at least 70 mole percent of mer units of the Formula II. Nonetheless the (trans)amidation reaction of the present invention is believed to proceed with as little as about 1 weight percent of such mer units, particularly if excess derivatizing agent is used.

In another preferred embodiment, the starting material polymers of the present invention are employed in the form of latices or emulsions, rather than aqueous solutions. Some polymers are manufactured in latex form, and for such polymers it is highly advantageous to utilize them in that form. High molecular weight polymers are often manufactured as water-in-oil latices, and this manufacturing technique is advantageous for polymers of such high molecular weight that solution polymerization is not practical. Lower molecular weight polymers could also be made in water-in-oil form, but generally there is no practical reason for employing this technique, which is more expensive generally than solution polymerization. Thus while there is no theoretical minimum molecular weight for a polymer employed in the present invention in latex form, in preferred embodiment such polymer has a molecular weight of at least 200,000, and more preferably at least 500,000, and even more preferably at least 1,000,000.

The fluorescent group(s) of the organic derivatizing agent in preferred embodiment contains an aromatic ring system, including polynuclear aromatic ring systems, which may also contain various functional groups. The molecule containing such aromatic ring system must also contain an amine radical, preferably a primary amine radical, which amine radical may or may not be directly substituted to the aromatic ring system. Other various functional groups that may be present in such molecule are carboxylic acid, sulfonic acid, hydroxyl, nitrile, keto, amine, substituted amine, and the like and such functional groups may or may not be directly substituted to the aromatic ring system. An extremely important advantage of the present invention is the number and variety of such organic fluorescent amine-containing compositions that are commercially available as water soluble compositions, and others that may become water soluble, or more water soluble, upon formation of the salts thereof. The fluorescent derivatizing agents useful for the present invention are available with fluorescent spectral characteristics that can distinguish one agent from the others. Thus a plurality of polymers may be each tagged with a different fluorescent group so as to be able to distinguish between such polymers by virtue of their resultant unique spectral characteristics.

In a preferred embodiment, with reference to Formula III above, the organic fluorescent derivatizing agent may be defined as one in which one of $R_5$ and $R_6$ is hydrogen and the other of $R_5$ and $R_6$ is an (alkylene)aromatic ring system in which the aromatic ring system may contain other substituents, particularly sulfonicacid, carboxylic acid and salts thereof and the aromatic ring system may be a polynuclear aromatic ring system. By (alkylene)aromatic ring system is meant that the aromatic ring system may be either bonded to its amine nitrogen through a carbon within the ring system or bonded to such nitrogen through an alkylene group or a combination of an alkylene group and a functional group, for instance when the (alkylene)aromatic ring system is an N-alkylene substituted aromatic amide.

The amine group of the organic fluorescent derivatizing agent may be covalently bonded directly to the agent's aromatic ring system, or it may be bonded to the ring system through an alkyl group. In other words, the group bonded to the ring system may be an amine, an amine substituted alkyl group, or an amine substituted alkyl group containing further substitution. In one preferred embodiment of the invention, the amine-containing fluorescent derivatizing agent is one containing an alkyl amine, and is so preferred because the (trans)amidation reaction proceeds efficiently with such an agent. In a different preferred embodiment of the invention, the amine-containing fluorescent derivatizing agent is one containing a primary amine covalently bonded to the ring system, and is so preferred because such agents are generally readily available at very low cost.

A very useful group of organic fluorescent derivatizing agents contain a naphthalene ring system, which ring system is substituted with at least one primary amine and at least one sulfonic acid group. There are many compositions within this group that are commercially available at reasonable cost, and there are many compositions within this group, distinguished from one another by the number of amine and sulfonic acid substituents and, for a given number of each substituent, by the position of each substituent on the naphthalene ring system. Below in Table I is a list of commercially available compositions within this group, identified as to number of substituents and ring positions, which list is not meant to be exhaustive of the compositions within this group.

Aldrich Chemical Company, Inc., lists in excess of 50 of such products in addition to naphthalene derivatives. Such compositions are generally dyes or dye intermediates, and include some compositions that do not have a polynuclear aromatic ring system, such as benzene derivatives and compositions containing a plurality of benzene rings. Again the amine group required for the present invention may be a primary amine covalently bonded directly to the aromatic ring or it may be a secondary amine bonded to the aromatic ring, or it may be bonded to another group in turn bonded to the aromatic ring.

There is no need generally for the (trans)-amidation reaction to proceed to extent where all of the organic fluorescent derivatizing agent is incorporated into the polymer. Residual fluorescent derivatizing agent is generally innocuous, and when desired may be separated from the product polymer, such as by selective precipitation of the polymer from the liquid system employed in the (trans)amidation reaction.

In preferred embodiment, the product polymer has different spectral properties than the organic fluorescent derivatizing agent, and hence the presence of product polymer successfully tagged by the (trans)amidation reaction can be determined merely by the presence of its particular major fluorescent peak(s).

The following Examples 1 through 37 demonstrate the advantages of the present invention, including without limitation the successful fluorescent tagging of pre-existing polymers without any deleterious effect on the polymer of any significance, using a wide variety of

TABLE I

| Composition Designation | Substituent at Specified Ring Position | | | | | | | |
|---|---|---|---|---|---|---|---|---|
| | 1 | 2 | 3 | 4 | 5 | 6 | 7 | 8 |
| a | $-NH_2$ | $-SO_3H$ | — | — | — | — | — | — |
| b | $-NH_2$ | — | — | $-SO_3H$ | — | — | — | — |
| c | $-NH_2$ | — | — | — | $-SO_3H$ | — | — | — |
| d | $-NH_2$ | — | — | — | — | $-SO_3H$ | — | — |
| e | $-NH_2$ | — | — | — | — | — | $-SO_3H$ | — |
| f | $-NH_2$ | — | — | — | — | — | — | $-SO_3H$ |
| g | $-SO_3H$ | $-NH_2$ | — | — | — | — | — | — |
| h | — | $-NH_2$ | — | — | $-S_3H$ | — | — | — |
| i | — | $-NH_2$ | — | — | — | $-SO_3H$ | — | — |
| j | — | $-NH_2$ | — | — | — | — | $-SO_3H$ | — |
| k | — | $-NH_2$ | — | — | — | — | — | $-SO_3H$ |
| l | $-SO_3H$ | $-NH_2$ | — | — | $-SO_3H$ | — | — | — |
| m | — | $-NH_2$ | — | $-SO_3H$ | — | — | — | $-SO_3H$ |
| n | — | $-NH_2$ | — | — | $-SO_3H$ | — | $-SO_3H$ | — |
| o | — | $-NH_2$ | — | — | — | $-SO_3H$ | — | $-SO_3H$ |
| p | — | $-NH_2$ | $-SO_3H$ | — | — | $-SO_3H$ | — | — |
| q | $-NH_2$ | — | — | $-SO_3H$ | — | — | — | $-SO_3H$ |
| r | $-NH_2$ | — | $-SO_3H$ | — | — | — | — | $-SO_3H$ |
| s | $-NH_2$ | — | — | $-SO_3H$ | — | — | $-SO_3H$ | — |
| t | $-NH_2$ | — | $-SO_3H$ | — | — | — | $-SO_3H$ | — |
| u | $-NH_2$ | — | $-SO_3H$ | — | — | $-SO_3H$ | — | — |
| v | $-NH_2$ | — | $-SO_3H$ | — | — | $-SO_3H$ | — | $-SO_3H$ |
| w | $-NH_2$ | — | — | $-SO_3H$ | — | $-SO_3H$ | — | $-SO_3H$ |
| x | — | $-NH_2$ | — | $-SO_3H$ | — | $-SO_3H$ | — | $-SO_3H$ |
| y | $-SO_3H$ | $-NH_2$ | — | — | $-SO_3H$ | — | $-SO_3H$ | — |
| aa | — | $-NH_2$ | $-SO_3H$ | — | — | $-SO_3H$ | — | $-SO_3H$ |

The amine-containing naphthalene compositions set forth in Table I above include amino naphthalene monosulfonic acids (Compositions a through k), amino naphthalene disulfonic acids (Compositions l through u), and amino naphthalene trisulfonic acids (Compositions v through aa), and various of these compositions are supplied as, or are available as, their sodium and/or potassium salt(s).

There are numerous commercially available products that contain a fluorescent group and either a primary or secondary amine, or a plurality of same. For instance, amine-containing fluorescent derivatizing agents. The derivatizing agents used were all commercially available, and many of such agents are commercially available at low cost. In some instances, noted in more detail below, the fluorescent spectras of the derivatized polymers differ from the fluorescent spectras of the derivatizing agents used, and hence one may confirm that fluorescent groups have been incorporated into the polymer by fluorescent spectral analysis without isolating the product polymer from any residual derivatizing agent that may be present. The synthesis method is exemplied using reaction mixtures containing high concentrations of polymer starting material, moderate pH conditions, a single reaction step, and generally low levels of derivatizing agent. The synthesis method proceeds successfully in short time periods. The polymers employed vary as to the amount of pendant groups of Formula I, and a number of the polymers employed have diverse pendant groups outside of Formula I. Exemplified are derivatizations using a single type of pendant group within Formula I, that is, an acrylic acid homopolymer, and a number of polymers containing both (meth)acrylic acid and acrylamide units.

The polymers employed as starting material polymers in Examples 1 to 37 each have more than 70 mole percent of mer units within Formula II and weight average molecular weights of less than 100,000. The following abbreviations are used for the polymer units of these and other Examples:

| AA | Acrylic acid |
|---|---|
| AcAm | Acrylamide |
| SMA | Sulfomethylacrylamide |
| VA | Vinyl acetate |
| MAA | Methacrylic acid |
| ACN | Acrylonitrile |

It has been fond that the (trans)amidation derivatization of the present invention may proceed together with other post-polymerization derivatization reactions that are feasible under the reaction conditions. For instance, in Examples 9, 10, 13, 20, and 22 to 32, a sulfomethylation derivatization reaction is conducted simultaneously using a formaldehyde-bisulfite ($HOCH_2SO_3Na$) derivatizing agent.

In a number of the synthesis Examples that follow, sodium hydroxide is added to the reaction mixture for the purpose of neutralizing the fluorescent derivatizing agent by forming the salt form, which is more water soluble.

EXAMPLE 1

20.76 g. of L-tryptophan was admixed into 115 g. of an aqueous solution containing 36.22 g. of an AA/AcAm copolymer (20 mole percent of L-tryptophan based on the total moles of mer units, both AA and AcAm, in the polymer). This admixture was placed into a 300 ml. Parr reactor and therein heated to 150° C. At this temperature the pressure within the Parr reactor was about 65 psi. The admixture was held therein at 150° C. for four hours, and then cooled to room temperature and removed from the reactor. The polymer product of this reaction was determined to have a weight average molecule weight of 11,700 and a polydispersity (weight average molecular weight/number average molecular weight) of 3.3, based on polystyrene sulfonate standards. Size Exclusion Chromatography with 0.03M sodium nitrate-phosphate buffer as the mobile phase was employed for residual L-tryptophan analysis. Since L-tryptophan fluoresces, a fluorescence detector was employed to monitor the elutents. The fluorescence monitoring was conducted at a wavelength of excitation of 280 nanometers and at a wavelength of emission of 370 nanometers, which identification of wavelengths can be expressed as "ex 280 nm" and "em 370 nm", a format used at times herein. It was determined that 24 weight percent of the L-tryptophan charged remained as residual, representing a 76 wt. percent incorporation into the polymer assuming no degradation of the L-tryptophan occurred. Thus about 15 mole percent of the mer units had been tagged, and it was determined by GPC analysis that the L-tryptophan tags had been incorporated into the polymer throughout its molecular weight range. This polymer could be detected with a fluorescence detector at concentrations as low as one ppm polymer in water without any difficulty.

In the following Examples 2 through 32 and 35 through 37, wherein about 140 to about 150 grams of aqueous solution of starting material polymer was employed, the reaction vessel used was also a 300 m. Parr reactor.

EXAMPLE 2

To 150 grams of an aqueous solution containing about 55 grams of an AA/AcAm/SMA terpolymer was added 1.11 grams (2 wt. percent based on polymer weight) of 1-[(2-aminoethyl)amino]naphthalene-5-sulfonic acid, as the sodium salt (having a formula weight of 288). This admixture was placed in a Parr reactor, purged with nitrogen, and then heated to 150° C., and held at this temperature for 5 hours, and then cooled to room temperature and removed from the reactor. The polymer product was determined to have a weight average molecular weight of 15,500 and a polydispersity of 2.1, based on polyethylene glycol standards. The molecular weight of this polymer product was about the same as the starting material polymer. Based on size exclusion chromatography, the fluorescent intensity of this polymer was about 62 times that of the starting material polymer, the pendant fluorescent groups appeared to be uniformly distributed on the polymer and only a very small peak from residual fluorescent derivatizing agent was observed at very long elution times.

EXAMPLE 3

The same procedure as described in Example 2 above was repeated except that the amine-containing fluorescent derivatizing agent was 1-(naphthylmethyl)amine, which was also used in the amount of 1.11 grams or 2 weight percent based on total polymer weight. The polymer product weight average molecular weight was determined to be 14,400 which was about the same as the starting material polymer, within experimental error. The fluorescent intensity of this polymer product was about 66 times that of the starting material polymer and the pendant fluorescent groups appeared to be uniformly distributed on the polymer.

EXAMPLES 4 to 8

The same procedure as described in Examples 2 and 3 above was repeated except that different amine-containing fluorescent derivatizing agents were employed, and these were all employed as in Examples 2 and 3, that is, in the amount of 1.11 grams or 2 weight percent based on total polymer weight. The resultant polymer product reaction mixture in each instance contained some residual derivatizing agent. The derivatizing agents employed and the characterization of the polymer products are set forth below in Table II.

TABLE II

| Example | Derivatizing Agent | Polymer Product Wt. Average Molecular Wt. | Polydispersity | Fluorescent Intensity |
|---|---|---|---|---|
| 4 | 1-amino-5-naphthalene sulfonic acid | 17,100 | 1.8 | 20 |
| 5 | 1-amino-5-naphthalene sulfonic acid | 16,100 | 1.9 | 6.5 |
| 6 | 2-amino-4,8-naphthalene disulfonic acid (disodium salt) | 15,800 | 2.1 | 7.7 |
| 7 | 1-amino-7-naphthalene sulfonic acid | 15,700 | 1.9 | 19.8 |
| 8 | 1-amino-4-naphthalene sulfonic acid | 15,600 | 2.1 | 19.6 |

EXAMPLES 9 and 10

In each of these Examples 9 and 10, to 145 grams of an aqueous solution containing 50.75 grams of an AA/AcAm copolymer was added 20.35 grams of HOCH$_2$SO$_3$Na (20 mole percent based on total moles of mer units in total starting material polymer) and 1.22 grams of 1-amino-5-naphthalene sulfonic acid, as the acid, (having a formula weight of 223.25). These admixtures were each placed in a Parr reactor, purged with nitrogen, and then heated to an elevated temperature, and held at that elevated temperature for 5 hours. In Example 9 such elevated temperature was 150° C., and in Example 10 it was 137° C. After such period of heating, the reaction mixtures were cooled to room temperature and removed from the reactor. In each of Examples 9 and 10 the polymer product had a polydispersity of 1.9 and similar weight average molecular weights, i.e., respectively 18,800 and 18,900. The fluorescent intensities of these polymer products were respectively 54.2 and 60.6 times greater than the starting material polymer. Residual fluorescent derivatizing agent was present in the reaction mixtures to a minor extent.

The above Examples 9 and 10 exemplify the conducting of a second post-polymerization derivatization, adding pendant groups useful for scale inhibiting applications, simultaneously with the (trans)amidation reaction to incorporate the fluorescent derivatizing agent into the polymer. More particularly, the formaldehyde-bisulfite employed in the reaction provides sulfomethylation derivatization to polymer pendant groups of Formula I above wherein R is —OR' and has been shown to proceed under reaction conditions of the (trans)amidation reaction. In preferred embodiment, at least one mole of the formaldehyde-bisulfite is used per 100 moles of mer units in the starting material polymer, and in more preferred embodiment at least 5 mole percent formaldehyde-bisulfite is employed based on total polymer mer units. In further preferred embodiments, the starting material polymer is an acrylic acid polymer or copolymer with acrylamide, and is a polymer having a weight average molecular weight of from about 2,000 to about 200,000, or at least to about 50,000 to 100,000.

EXAMPLE 11

To 150 grams of an aqueous solution containing about 48.75 grams of an acrylic acid homopolymer was added 0.98 grams (about 2 wt. percent based on polymer weight) of 1-amino-5-naphthalene sulfonic acid, as the acid, (having a formula weight of 223.25). This admixture was placed in a Parr reactor, purged with nitrogen, and then heating to 150° C. for 5 hours, and then cooled to room temperature and removed from the reactor. The polymer product was determined to have a weight average molecular weight of 5,100 (as compared to about 4,500 for the starting material polymer) and a polydispersity of 1.5. The fluorescent intensity of this polymer product was about 366 times that the starting material polymer, and the pendant fluorescent groups appeared to be uniformly distributed on the polymer. Some residual derivatizing agent was observed in the gel permeation chromatograms.

EXAMPLE 12

The same procedure as described in Examples 2, 3 and 4 to 8 above was repeated (all of which, including the present example, employed an AA/AcAm/SMA starting material polymer) except that the fluorescent derivatizing agent employed was the 2-amino-1-naphthalene sulfonic acid, as the acid, and this was employed in the amount of 1.11 grams or 2 weight percent based on total polymer.

EXAMPLE 13

The procedure described in Example 10 above was repeated except that the amine-containing fluorescent derivatizing agent employed was the disodium salt of 1-amino-3,6,8-naphthalene trisulfonate (anhydrous formula weight of 427.34). The amount of this derivatizing agent employed was 1.22 grams.

EXAMPLE 14

To 150 grams of an aqueous solution containing about 52.5 grams of an AA/AcAm/VA terpolymer was added 1.05 grams (2 wt. percent based on polymer weight) of 1-amino-5-naphthalene sulfonic acid, as the acid, (having a formula weight of 233.25). This admixture was placed in a Parr reactor, purged with nitrogen, and then heated to 150° C., and held at this temperature for 5 hours, and then cooled to room temperature and removed from the reactor. The reaction mixture was a clear tan color having a pH of 4.6. The polymer was determined to be 58 mole percent anionic at pH of 10 by titration.

EXAMPLES 15 and 16

Example 14 was repeated except that different starting material polymers were used. Example 15's starting material polymer was an AA/AcAm/MAA terpolymer and Example 16's starting material polymer was an AA/AcAm/ACN terpolymer. The reaction mixtures (after reaction) were respectively a turbid brown solution with solid material settled at the bottom and a clear brown solution, and respectively had pH's of 4.5 and 4.6. Example 15's product polymer was determined to be 56 mole percent anionic at pH of 10 by titration.

Example 16's product polymer was determined to be 65 mole percent at pH 10 by titration.

EXAMPLES 17 to 19

In each of these Examples 17 to 19, to 150 grams of an aqueous solution containing 52.5 grams of a starting material polymer (described below) was added 1.05 grams (2 wt. percent based on polymer weight) of 1-amino-7-naphthalene sulfonic acid, as the acid, (having a formula weight of 223.25). These admixtures were each placed in a Parr reactor, purged with nitrogen, and then heated to 150° C., and held at this temperature for 5 hours, and then cooled to room temperature and removed from the reactor. The starting material polymers and some product characteristics are set forth below in Table III.

TABLE III

| Example | Starting Material Polymer Monomer Units | Reaction Mixture | | Polymer Product Mole % Anionic at pH 10 (by titration) |
|---|---|---|---|---|
| | | pH | Visual Appearance | |
| 17 | AA/AcAm/ACN | 4.6 | clear brown soln. | 62 |
| 18 | AA/AcAm/VA | 4.6 | clear yellow soln. | 58 |
| 19 | AA/AcAm/MAA | 4.5 | turbid yellow soln. | 56 |

EXAMPLE 20

The procedure described in Example 10 above was repeated except that the amine-containing fluorescent derivatizing agent employed was the 1-amino-7-naphthalene sulfonic acid employed as the acid, (formula weight of 223.25) and the amount of this derivatizing agent employed was 1.22 grams.

EXAMPLE 21

The procedure described in Examples 17 to 19 above was repeated except an AA/AcAm/SMA terpolymer was used as the starting material polymer. This terpolymer is like that used in Examples 2 to 8 and 12 above except that the pH of the aqueous polymer solution was about 11.

EXAMPLES 22 to 24

In each of these Examples 22, 23 and 24, to 145 grams of an aqueous solution containing 50.75 grams of an AA/AcAm copolymer was added 20.35 grams of $HOCH_2SO_3Na$ (20 mole percent based on total moles of mer units in total starting material polymer) and 1.22 grams of 1-amino-3,6,8-naphthalene trisulfonic acid as the disodium salt (monoacid having an undetermined amount of water of hydration and an anhydrous formula weight of 427.34). The starting material polymers of each of these Examples were prepared in different polymerization batches. Each admixture was placed in Parr reactors, purged with nitrogen, heated to 137° C. and held at such elevated temperature for a period of 5 hours.

EXAMPLE 25

The procedure of Examples 22 to 24 above was repeated except that instead of the trisulfonic acid fluorescent derivatizing agent, 1.22 grams of 1-amino-7-naphthalene sulfonicacid was used. The product reaction mixture was a bright yellow solution having a pH of 5.0.

EXAMPLES 26 to 28

The procedures of Examples 22 to 24 above was repeated except that in each of these Examples 26 to 28 a different fluorescent derivatizing agent was used and sodium hydroxide was added to each reaction mixture. The 50.75 grams of AA/AcAm copolymer starting material represents 0.710 moles of polymer mer units. In each of these Examples the amount of fluorescent derivatizing agent employed represented 0.005 moles, or 0.7 mole percent based on total moles of mer units, and 0.44 grams of 50 percent NaOH (0.005 moles) was added to each reaction mixture. The identities of the derivatizing agents used and the characterizations of the product reaction mixtures are set forth below in Table IV.

TABLE IV

| | | Product Polymer Mole Percent of | | | Product Reaction Mixture | |
|---|---|---|---|---|---|---|
| Example | Derivatizing Agent | $-CONH_2$ | $-CO_2$ | $-SO_3-$ | Wt. Percent Polymer | Appearance |
| 26 | 2-amino-1-naphthalene sulfonic acid | 26 | 56 | 18 | 37.6 | very turbid |
| 27 | 2-amino-6-naphthalene sulfonic acid | 27 | 55 | 18 | 37.6 | contains insoluble solids |
| 28 | 2-amino-8-naphthalene sulfonic acid | 29 | 53 | 17 | 36.9 | slightly turbid |

EXAMPLES 29 to 32

The procedure of Examples 22 to 24 above was repeated except that in each of these Examples 29 to 32 a different fluorescent derivatizing agent was used and sodium hydroxide was added to each reaction mixture. The 50.75 grams of AA/AcAm copolymer starting material represents 0.710 mole of polymer mer units. In each of these Examples the amount of fluorescent derivatizing agent employed represented 0.004 moles, or about 0.56 mole percent based on total moles of mer units, and 0.28 grams of 50 percent NaOH (0.004 moles) was added to each reaction mixture. The identities of the derivatizing agents used and the characterizations of the product reaction mixtures are set forth below in Table V.

TABLE V

| | | Product Polymer Mole Percent of | | | Product Reaction Mixture | |
|---|---|---|---|---|---|---|
| Example | Derivatizing Agent | $-CONH_2$ | $-CO_2$ | $-SO_3-$ | Wt. Percent Polymer | Appearance |
| 29 | 2-amino-4,8-naphthalene | 27 | 55 | 18 | 37.7 | slightly turbid |

TABLE V-continued

| Example | Derivatizing Agent | Product Polymer Mole Percent of | | | Product Reaction Mixture | |
|---|---|---|---|---|---|---|
| | | —CONH$_2$ | —CO$_2$ | —SO$_3$— | Wt. Percent Polymer | Appearance |
| | disulfonic acid disodium salt | | | | | |
| 30 | 2-amino-1,3-naphthalene disulfonic acid disodium salt | 22 | 60 | 18 | 37.7 | slightly turbid |
| 31 | 2-amino-6,8-naphthalene disulfonic acid mono-potassium salt | 26 | 57 | 17 | 31.2 | moderately turbid |
| 32 | 2-amino-3,6-naphthalene disulfonic acid mono-sodium salt (trihydrate) | 26 | 57 | 17 | 37.3 | very turbid |

EXAMPLE 33

A (trans)amidation reaction was conducted in a 10 ml. reactivial at 80° C., using a solution of an acrylic acid/acrylamide/sulfomethylacrylamide terpolymer, diluted to 10 weight percent polymer solids, buffered to pH of 5 with 0.1M phosphate buffer, to which was added 1 weight percent based on polymer solids of the amine-containing fluorescent derivatizing agent. The derivatizing agent used was Cresyl Violet Acetate which is commercially available from the Aldrich Chemical Company, Inc. The polymer product was recovered and purified by double precipitation in acetone, filtering the polymer/acetone mixture through acetone-washed millipore filter (type N, 0.45 μm nylon membrane filters), and then subjected to gel permeation chromatography with fluorescence detection. The product polymer was determined to have a major light absorption peak at a wavelength of 584 nm and a major fluorescent emission peak at a wavelength of 613 nm and contained about 0.046 weight percent of the fluorescent group.

EXAMPLE 34

The procedure of Example 35 was repeated except that the polymer starting material was an AA/AcAm copolymer and the fluorescent derivatizing agent was Brilliant Acid Yellow 8G from Pylam Dyes. The product polymer was determined to have a major light absorption peak at a wavelength of 420 and a major fluorescent emission peak at a wavelength of 510. The amount of fluorescent group incorporated into the polymer was undetermined.

EXAMPLES 35 to 37

A (trans)amidation reaction was conducted using an AA/AcAm/SMA terpolymer starting material and in each Example a different fluorescent derivatizing agent, described below. In each Example 150 grams of an aqueous solution containing 55.5 grams of the starting material polymer was used. In Examples 35 and 36 the polymer solutions were buffered to pH of 7 with 0.1M phosphate buffer. In Example 37 the polymer solution was buffered to pH of 9 in the same manner. The derivatizing agent employed was added to the polymer solution and the reaction conducted in a 300 ml. Parr reactor at 150° C. for a 5 hour period in each Example. The derivatizing agents used were respectively L-tryptophan in Example 35, tryptamine in Example 36, and Fluoresceinamine (available from Aldrich Chemical Company) in Example 37. The product polymers were isolated and purified as described above in Examples 33 and 34. The amount of the derivatizing agent used, the major absorption and emission peaks of the polymer products, and the approximate weight percent of the fluorescent group contained in the polymer product, as set forth below in Table VI:

TABLE VI

| Example | Wt. % Derivatizing Agent based on Polymer Solids | Substituent at Specified Ring Position | | Wt. % Fluorescent Group |
|---|---|---|---|---|
| | | Absorption Peak Wavelength (nm) | Emission Peak Wavelength (nm) | |
| 37 | 10 | 265 | 350 | 0.59 |
| 38 | 5 | 272 | 351 | 1.83 |
| 39 | 5 | 488 | 524 | 0.71 |

As seen from the foregoing, polymers prepared by the (trans)amidation of a polymer having mer units of Formula I above, using as the (trans)amidation derivatizing agent an organic fluorescent composition of Formula III above, may be defined by the structural formula of Formula V below:

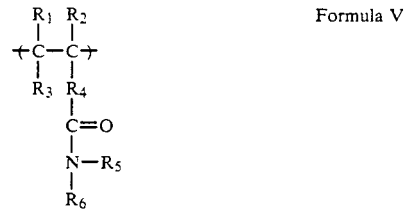

Formula V wherein $R_1$, $R_2$, $R_3$ and $R_4$ are as defined above for Formula II, and $R_5$ and $R_6$ are as defined above for Formula III. In preferred embodiment the present invention is also directed to polymers having mer units of Formula V wherein one of $R_5$ and $R_6$ is hydrogen and the other is an (alkylene)naphthalene which may be further substituted on the naphthalene ring with one or more sulfonic acid groups or salts thereof. By "(alkylene)naphthalene" is meant herein both a naphthalene group directly bonded to the nitrogen of Formula V or a naphthlene bonded to the nitrogen through an alkylene or partially alkylene group, or the alkylene group, or partial alkylene group, is bonded to the naphthalene ring through a functional group.

In preferred embodiment the derivatizing agents are selected from those that a reasonably high "relative performance" for a given background. As noted above, a molecule is generally considered highly fluorescent when it has a fluorescent quantum efficiency, or fluorescent quantum yield, within the range of from about 0.1 to about 1.0, and a light absorbance molar extinction coefficient of at least 1,000. The magnitude of fluorescent signal, or relative fluorescence, is the product of the fluorescent quantum yield multiplied times the light absorbance molar extinction coefficient. Thus for instance if two compositions each had the minimal 1,000 light absorbance molar extinction coefficient, but one had a fluorescent quantum yield of 0.1 and the other had a fluorescent quantum yield of almost 1.0, the latter would have a ten-fold higher relative fluorescence. For a given application, however, that feature alone would not render the latter derivatizing agent the better choice, because the relative fluorescence determination does not take into consideration any fluorescent background characteristics of the medium (either natural or added by the system process) in which the tagged polymer is to be used, generally referred to as background fluorescence. The "relative performance", as this phrase is used herein, is the ratio of the relative fluorescence of a composition to the relative fluorescence of a given background medium. The fluorescence readings are typically measured at the excitation/emission wavelengths that represent major peaks for the given fluorescent tagged polymer. For a given process sample background, two compounds having similar relative fluorescence values, but at different excitation and/or emission wavelengths, may have diverse relative performance values because their relative performances are being measured at different wavelengths and the fluorescent intensity of the background at these diverse wavelengths may be significantly different. Some generalities may be considered. Industrial cooling waters generally have an overall higher fluorescent intensity than industrial boiler waters, and therefore a degree of polymer tagging that is reasonably high for use in boiler waters may not be sufficiently high for cooling waters, since of course the intensity of fluorescence must not be overwhelmed by the background fluorescence and the intensity of fluorescence is dependent on the concentration level of the fluorescent species. Similarly, a polymer that is to be used at high concentration levels in a given background medium need not be tagged to the same extent as one that is to be used at much lower concentration levels, other parameters being the same. Further, a derivatizing agent that is satisfactory for use in one type of background medium, for instance cooling waters, may not be suitable for tagging polymers that are to be used in a different medium, for instance waste water, because that agent's major excitation/emission peaks may substantially coincide with the background fluorescence peaks of the waste water and hence have a low relative performance value for such a background.

As noted above, the amino-naphthalene sulfonic acid derivatizing agents generally have different major fluorescent peaks than the product polymer tagged with such agent. While this spectral shift is obviously highly advantageous for determining the success of a derivatization and/or presence of residual agent, it of course renders the relative performance of the agent for a given background somewhat different than the relative performance of a polymer tagged with such agent because such relative performances are being measured in somewhat different spectral areas. Nonetheless this shift and its impact on relative performances is, for the purposes of using the agents per se in relative performance determinations against a given background, a minor effect that does not diminish the value of such determinations, particularly since the use of the fluorescence spectral data of the derivatizing agents in a given background permits a large number of agents to be screened without the burden of conducting a large number of derivatizing reactions.

Thus in Example 38 below a survey of relative performance values of a number of fluorescent derivatizing agents against a cooling water background is given as representative of the use of such screening method for any other group of derivatizing agents and any other type of background.

EXAMPLE 38

The relative performances of a variety of fluorescent derivatizing agents were surveyed against a cooling water background as follows. An aqueous solution of each agent at a concentration level of 0.4 ppm (acid actives) and the fluorescent intensity of each agent at its fluorescence maximum was determined, in comparison to a fluorescence reference standard. The standard used was 1,5-naphthalene disulfonic acid, which is not a derivatizing agent for the purposes of the present invention because it has no amine functionality. This standard was also measured at its fluorescence maximum in an aqueous solution at a concentration of 0.4 ppm (acid actives) and its intensity was assigned a "relative intensity value" of 100%. The "relative intensity values" of each of the other compositions tested were assigned in relationship to the intensity of the standard. For instance, a composition that had twice the intensity of the standard (the standard and the composition each being measured at their own fluorescence maximums) would be given a relative intensity value of 200%. Then the relative intensity values of the various compositions were compared to that of the cooling water background at the fluorescent maximum (peak excitation/emission wavelengths) of the composition. The cooling water fluorescent intensity employed was the average relative intensity of ten representative cooling water formulations measured for combination of wavelengths of excitation and emission within the range required for this survey. The relative performance for each composition thus is the value determined by dividing the relative intensity value determined for the fluorescence of each composition by the relative intensity value of the background fluorescence of cooling water at the same combination of wavelengths. The identities of the various compositions surveyed and the values determined are set forth below in Table VII.

TABLE VII

| Composition | Fluorescent Maximum ("nm") ex/em | Relative Intensity Values (%) Composition/Background | Relative Performance |
| --- | --- | --- | --- |
| 1,5-naphthalene disulfonic | 290/330 | 100/7.2 | 14 |

TABLE VII-continued

| Composition | Fluorescent Maximum ("nm") ex/em | Relative Intensity Values (%) Composition/Background | Relative Performance |
|---|---|---|---|
| acid (the standard) | | | |
| 1-amino-4-naphthalene sulfonic acid | 325/420 | 444/18.5 | 24 |
| 1-amino-5-naphthalene sulfonic acid | 240/480 | 14/34.8 | 0 |
| 1-amino-6-naphthalene sulfonic acid | 245/485 | 74/22.7 | 3 |
| 1-amino-7-naphthalene sulfonic acid | 340/480 | 80/11.0 | 7 |
| 1-amino-8-naphthalene sulfonic acid | — | 0/— | 0 |
| 2-amino-1-naphthalene sulfonic acid | 245/485 | 150/22.7 | 7 |
| 2-amino-5-naphthalene sulfonic acid | 245/440 | 750/9.2 | 82 |
| 2-amino-6-naphthalene sulfonic acid | 245/420 | 760/9.7 | 78 |
| 2-amino-7-naphthalene sulfonic acid | 245/440 | 446/9.2 | 48 |
| 2-amino-8-naphthalene sulfonic acid | 240/440 | 638/8.5 | 75 |
| 1-amino-4,8-naphthalene disulfonic acid | 255/500 | 122/26.2 | 5 |
| 1-amino-3,8-naphthalene disulfonic acid | 245/480 | 540/21.6 | 25 |
| 2-amino-1,5-naphthalene disulfonic acid | 250/420 | 486/10.0 | 49 |
| 2-amino-4,8-naphthalene disulfonic acid | 245/440 | 564/9.2 | 61 |
| 2-amino-5,7-naphthalene disulfonic acid | 250/460 | 776/8.0 | 97 |
| 2-amino-6,8-naphthalene disulfonic acid | 250/445 | 69/9.6 | 7 |
| 2-amino-3,6-naphthalene disulfonic acid | 250/440 | 77/9.8 | 8 |
| 1-amino-3,6-naphthalene trisulfonic acid | 360/500 | 4/9.0 | 0 |
| 4-amino-benzene sulfonic acid | 250/340 | 26/3.2 | 8 |
| 2-amino-5-methylbenzene sulfonic acid | 240/370 | 19/7.2 | 3 |
| amino-2,5-benzene disulfonic acid | 310/380 | 54/14.0 | 4 |
| 2-amino-benzoic acid | 240/400 | 110/8.5 | 13 |
| 3-amino-benzoic acid | 240/370 | 21/7.2 | 3 |
| 4-amino-benzoic acid | 270/340 | 82/6.2 | 13 |
| aniline | 230/340 | 4/4.7 | 1 |

From the survey results set forth in Table VII above, it is noted that the 1-amino-8-naphthalene sulfonic acid did not provide detectable fluorescence. Beyond such composition, the survey results provide a good measure of which derivatizing agents may be preferred for tagging polymers to be used in cooling waters. Generally a relative performance value of at least 5 is preferred, a relative performance value of at least 10 is more preferred, and most preferred are those agents having a relative performance value of 15 and greater. A low performance value on a given survey, however, does not exclude a composition as a potential derivatizing agent generally. For instance, 1-amino-6-naphthalene sulfonic acid has a relative performance value in the survey of Table VII of only 3, but its relative intensity value is 74%. In comparison, the 4-amino-benzene sulfonic acid has a higher relative performance value of 8 and a lower relative intensity value of 26. Thus while 1-amino-6-naphthalene sulfonic acid may not be a preferred tagging agent for cooling water polymers, its relative intensity is sufficiently high that it may well be a preferred agent for polymers to be used in an application with a different background fluorescence. In addition, those compositions shown to have low relative intensities may be sufficient for use in polymers to be used in mediums having lower background fluorescent intensities, and may be there the agent of choice for other reasons, such as cost, availability, efficiency of derivatization reaction, toxity, compatibility, or other reasons. Hence surveys as shown in Example 38 are a tool for making a reasonable selection of derivatizing agent for a given known purpose, and not an absolute categorization of potential usefulness of derivatizing agents in all applications.

EXAMPLE 39

Using the polymer derivatized as described in Example 7 above as a representative polymer suitable for cooling water treatment, the tolerance of the polymer, as to fluorescent intensity, upon exposure to chemical species generally present in industrial cooling waters was determined as follows. For each chemical species tested, an aqueous solution of the polymer (at a concentration level of 7.5 ppm as acid actives) and a certain amount of the chemical species was prepared and mixed for one minute, after which the fluorescent intensity was determined and compared to a sample of the same polymer, similarly diluted, but not exposed to any of the chemical species. The concentrations of the chemical species, which are set forth in Table VIII below, were 10 times or greater than the concentrations encountered in typical cooling waters. The results are reported as a percentage of fluorescent intensity, as compared to the polymer sample not exposed to any chemical species (the blank), which of course would be rated as 100%. The test results are set forth below in Table VIII. It is noted that an interference is commonly considered a chemical species or operating condition that produces a 10% change in the analytical response. These tests were designed to detect fluorescence quenching which would occur instantly, if at all. It is seen from Table VIII below that the various chemical species tested, except very high levels of ionic iron, do not produce an interference result even at the very high concentration levels employed. Given these test results, it is believed that none of the chemical species will have any significant effect on the fluorescent intesity of the tagged polymer in typical cooling water systems. Fluorescent intensity values that differ by 1% or less are considered equivalent, being within statistical error limits.

TABLE VIII

| Chemical Species | Chemical Species Concentration | Fluorescent Intensity (%) |
|---|---|---|
| $Ca^{-2}$ | 10,000 ppm (as $CaCO_3$) | 100 |
| $Mg^{-2}$ | 10,000 ppm (as $CaCO_3$) | 100 |
| $HCO_3^-$ | 10,000 ppm (as $CaCO_3$) | 102 |
| $SO_4^{-2}$ | 10,000 ppm (as $SO_4^{-2}$) | 99 |
| $Cl^-$ | 10,000 ppm (as $Cl^-$) | 99 |
| $Na^-$ | 10,000 ppm (as $Na^-$) | 102 |
| $Zn^{-2}$ | 10 ppm (as $Zn^{-2}$) | 97 |
| $Fe^{-2}$ | 10 ppm (as $Fe^{-2}$) | 52 |
|  | adjust to pH 3 | 96 |
|  | adjust to pH 10 | 103 |

In addition, a polymer such as that prepared in Example 7, tagged with a sulfonate-containing derivatizing agent, is extremely tolerant, as to fluorescent intensity, to extremely high levels of bleach, a substance also found in industrial water systems, while the derivatizing agents themselves are much less tolerant.

EXAMPLE 40

Using the polymers derivatized as described in Examples 4, 7 and 10 above as representative of polymers suitable for cooling water treatment, the effect of the tagging on polymer performance was determined as follows. These three tagged polymers, and an underivatized AA/AcAm/SMA terpolymer of the same composition as employed in Examples 4, 7 and 10, were tested to determine their performances in a calcium phosphate threshold inhibition performance test using test conditions described in U.S. Pat. No. 4,752,443 which is hereby incorporated hereinto by reference. The calcium phosphate inhibition results are reported in percent inhibition as described in such patent. The test results are set forth below in Table IX.

TABLE IX

| Polymer Preparation Example | % Calcium Phosphate Inhibition |
|---|---|
| Example 4 | 81 |
| Example 7 | 83 |
| Example 10 | 80 |
| underivatized AA/AcAm/SMA terpolymer | 85 |

As seen from the results set forth in Table IX above, the fluorescent tagging of these polymers has not caused a detrimental response to the calcium phosphate inhibition performance of the polymers.

The fluorescent derivatizing agents that have functionalities other than the aromatic ring system and the amine, for instance the amino-naphthaline mono- and disulfonic acids, have toxity levels, as reported in the literature for the LD50 test, oral administration on rats, that are favorably low, for instance in comparison to aniline (benzene amine). A sampling of such literature toxicity data is set forth below in Table X.

TABLE X

| Derivatizing Agent | Reported LD50 (oral/rats) Toxity Data (grams/kilogram) |
|---|---|
| 2-amino-1-naphthalene sulfonic acid | 19.4 |
| 2-amino-6-naphthalene sulfonic acid | >5.0 |
| 2-amino-4,8-naphthalene disulfonic acid | >5.0 |
| 2-amino-5,7-naphthalene disulfonic acid | 2.0 |
| 2-amino-6,8-naphthalene disulfonic acid | >5.0 |
| aniline | 0.25 |

In the following Example 41 there is given a post-polymerization derivatization procedure suitable for polymers whose molecular weights are too high to be used as a water solution. The polymer starting material is of the type commercially available in the form of a water-in-oil emulsion or latex and the polymer is useful for industrial waste water treatment.

EXAMPLE 41

170.0 grams of a water-in-oil latex which contained 51.85 grams of a polymer was admixed with 5.05 grams of additional surfactant, a solution of taurine (2-aminoethanesulfonic acid) and a solution of 2-amino-8-naphthalene sulfonic acid, to form the reaction mixture. The polymer was a homopolymer of acrylamide having a weight average molecular weight of about 10,000,000 (a reduced specific viscosity of about 20). The polymer was formed in such water-in-oil latex form and such latex contains about 2 weight percent surfactant based on total latex. The additional surfactant employed was a nonionic surfactant commercially available from ICI Americas, Inc. under the tradename of Span 80 (Span is a registered trademark of ICI Americas, Inc.). The taurine solution was comprised of 9.12 grams taurine, 5.83 grams of 50% NaOH, and 1.63 grams of deionized water. The solution of 2-amino-8-naphthalene sulfonic acid was comprised of 1.04 g. 2-amino-8-naphthalene sulfonic acid, 0.37 grams of 50% NaOH, and 8.99 grams of deionized water. The taurine solution was heated to dissolve the taurine and added slowly to the latex (with the additional surfactant) while stirring, and then the 2-amino-8-naphthalene sulfonic acid solution was added slowly while likewise stirring. The reaction mixture was transferred to a 300 ml. Parr reactor, which was then purged with nitrogen for about 30 minutes, and then the reactor was fully closed and heated to 140° C. for a four hour reaction period. The reaction product was substantially in latex form and analysis indicated that a degree of tagging had been accomplished, together with a post-polymerization transamidation reaction with the taurine.

In the following Examples 42 to 45, the fluorescent derivatizing agents used were sulfanilic acid (4-aminobenzenesulfonic acid) and anthranilic acid (ortho-aminobenzoic acid or 2-aminobenzoic acid), and in some instances a concommitant post-polymerization derivatization with sodium formaldehyde bisulfite was conducted.

EXAMPLE 42

80 grams of an aqueous solution containing 35 weight percent of an AcAm/AA copolymer (50/50 mole percent, having a weight average molecular weight of about 13,000) was admixed with 0.69 grams of sulfanilic acid, and the admixture was transferred to a 300 ml. Parr reactor, which was then purged with nitrogen for about 30 minutes, and then sealed and heated to 150° C. for about 5 hours. The analysis of the reaction product indicated that a degree of fluorescent tagging of the polymer had occurred.

EXAMPLE 43

Example 42 was repeated except the sulfanilic acid charge was reduced to 0.67 grams, 11.22 grams of 93.5% $HOCH_2SO_3Na$ was added to the reaction mixture, and the reaction temperature was reduced to 137° C. Analysis of the reaction product indicated that both derivatization reactions had occurred to some degree.

EXAMPLE 44

Example 43 was repeated except that 0.67 grams of anthranilic acid was substituted for the sulfanilic acid charge. Analysis of the reaction product indicated that both derivatization reactions had occurred to some degree.

EXAMPLE 45

150 grams of the 35% polymer solution described in Example 42 above was admixed with 1.26 grams of anthranilic acid, transferred to a 300 ml. Parr reactor, which was then purged with nitrogen for about 30 minutes, sealed, and heated to 138° C. for 5 hours. Analysis of the reaction product indicated that the fluorescent tagging of the polymer had occurred to some degree.

It has been generally observed that the fluorescent intensities of the polymers prepared according to Examples 41 to 45 above were not as strong as that seen from solution derivatizations using various amino-naphthalene mono- and di-sulfonic acids, but such lesser fluorescent intensity is no deterent to the use of such polymers in applications where the background fluorescent is less intense than cooling waters and/or where the polymers are used at higher concentration levels than is typical for cooling water treatment polymers.

EXAMPLE 46

The starting material polymer was a 50/50 mole ratio AA/AcAm copolymer which was characterized as set forth in Table XI below and the description thereafter.

TABLE XI

| AcAm/AA Copolymer | |
|---|---|
| Weight Average Molecular Weight | 16,900 |
| Number Average Molecular Weight | 8,700 |
| Polydispersity | 1.9 |

The molecular weight averages set forth in Table XI above were calculated from the refractive index (RI) detector traces initially obtained for this sample. This polymer was also used as the "reference" for the dual detector examination of the fluorescent labelling for the polymers of Examples 47 and 48 below. Fluorescent profiles were obtained for this polymer at excitation/emission wavelength settings of both 260/380 and 260/330. No fluorescence was detected in the polymeric regions of this sample at either setting. This observation means that the fluorescence observed for the other two polymers can be attributed to the fluorescent labelling. To 220.0 grams of this aqueous solution containing about 81.2 grams of the AA/AcAm copolymer (about 36.9 wt. percent concentration of copolymer) was added 3.26 grams of 2-amino-6,8-naphthalene disulfonic acid as the mono-potassium salt, and the resultant admixture (223.26 grams total) was placed in a 300 ml-Parr reactor, which reactor was then purged with nitrogen, closed, heated to 138° C. and held at 138° C. for three hours. The resultant reaction mixture upon cooling was an aqueous solution.

EXAMPLE 47

To 111.63 grams of resultant reaction mixture of Example 46 above was added 14.2 grams of taurine (2-aminoethanesulfonic acid or "SE"). This admixture contained about 0.5675 moles of the mer units of the AA/AcAm copolymer after the initial derivatization of Example 46 and 0.1135 moles of the taurine. This admixture (125.83 grams total) was placed in a 300 ml-Parr reactor, which reactor was then purged with nitrogen, closed, heated to 138° C. and then held at 138° C. for five and one/half hours. The polymer of a sample of the resultant reaction mixture, after cooling, was determined to have the characteristic set forth in Table XII below and described thereafter.

TABLE XII

| AcAm/AA/SE Polymer | |
|---|---|
| Weight Average Molecular Weight | 18,700 |
| Number Average Molecular Weight | 9,900 |
| Polydispersity | 1.9 |

The molecular weight averages quoted above were calculated from the refractive index (RI) detector traces initially obtained for this polymer. The fluorescent labelling of this polymer was examined using dual detector techniques. Overlays of the RI fluorescent profiles obtained for this polymer (excitation/emission wavelength 260/380) indicated that the fluorescent label was evenly incorporated across the polymer's molecular weight distribution. At the detector settings used, the ratio of the fluorescent to RI chromatographic areas in the polymeric region was approximately 4.8:1. This value gives an indication of a polymer's proportionate fluorescent labelling when compared to the values obtained for the reference polymer at the same detector settings. There was no evidence of appreciable unreacted label eluting at very low molecular weight. This polymer's fluorescent labelling appeared to be very similar to that of the polymer of Example 48 below. The sample was analyzed by C-13 NMR and the polymer was identified as an acrylic acid, acrylamide, imide and sulfoethylacrylamide (SE) polymer with mole percentages of 65, 12, 10, and 13 respectively.

EXAMPLE 48

To 52.14 grams of resultant reaction mixture of Example 46 above was added 2.97 grams of aminomethylphosphonic acid (AMPA) and 52.14 grams of deionized water. The water dilution was not required to lower the viscosity but instead was added to increase the total weight of the reaction mixture to above the 100 gram minimum required for a 300 ml-Parr reactor. This admixture contained about 0.2670 moles of the mer units of the AA/AcAm copolymer after the initial derivatization and 0.0267 moles of the AMPA. This admixture (125.83 grams total) was placed in a 300 ml-Parr reactor, which reactor was then purged with nitrogen, closed, heated to 138° C., and held at 138° C. for five and one/half hours. The polymer of a sample of the resultant reaction mixture, after cooling, was determined to have the characteristic set forth in Table XIII below and described thereafter.

TABLE XIII

| AcAm/AA/AMPA Polymer | |
|---|---|
| Weight Average Molecular Weight | 18,000 |
| Number Average Molecular Weight | 9,600 |
| Polydispersity | 1.9 |

The molecular weight averages above were calculated from the refractive index (RI) detector traces initially obtained for this polymer. The fluorescent labelling of this polymer was examined using dual detector techniques. Overlays of the RI and fluorescent profiles obtained for this polymer (excitation/emission wavelength 260/380) indicated that the fluorescent label was evenly incorporated across the polymer's molecular weight distribution. At the detector settings used, the ratio of the fluorescent to RI chromatographic areas in the polymeric region was approximately 4.9:1. This value gives an indication of a polymer's proportionate fluorescent labelling when compared to the values obtained for the reference polymer at the same detector settings. There was no evidence of appreciable unreacted label eluting at very low molecular weight. The sample was then adjusted to a pH of 11 and an NMR spectrum thereof was taken. This spectrum exhibited the carbonyl signals attributed to acrylic acid, salt, acrylamide and the salt of phosphonomethylacrylamide with mole percentages of 75, 13, and 12 respectively.

It is believed that a similar but simultaneous (trans)amidation/sulfoalkylation derivatization would produce a polymer commensurate with the product polymer of Example 47 above, as follows. Using as the starting material polymer the 50/50 mole ratio AA/AcAm copolymer which is described in Example 46 above, and for which no fluorescence would detected in the polymeric regions either of the excitation/emission wavelengths settings, to 220.0 grams of an aqueous solution containing about 81.2 grams of the AA/AcAm copolymer (about 36.9 wt. percent concentration of copolymer) is added 3.26 grams of 2-amino-6,8-naphthalene disulfonic acid, as the mono-potassium salt, and about 28 grams of taurine (2-aminoethanesulfonic acid or "SE"). The resultant admixture (about 251 grams total) would be placed in a 300 ml-Parr reactor, which reactor would then be purged with nitrogen, closed, heated to 138° C. and held at 138° C. for about five and one/half hours. The resultant reaction mixture upon cooling would provide a polymer reasonably commensurate to that of Example 47 above as to its weight average molecular weight, polydispersity, extent and distribution of pendant fluorescent groups and mer units of acrylic acid, acrylamide, imide and sulfoethylacrylamide (SE) polymer with mole percentages of about 65, 12, 10, and 13 respectively.

It is believed that a similar but simultaneous (trans)amidation/phosphonoalkylation derivatization would produce a polymer commensurate with the product polymer of Example 48 above, as follows. Using as the starting material polymer the 50/50 mole ratio AA/AcAm copolymer which is described in Example 46 above, and for which no fluorescence would detected in the polymeric regions either of the excitation/emission wavelengths settings, to 220.0 grams of an aqueous solution containing about 81.2 grams of the AA/AcAm copolymer (about 36.9 wt. percent concentration of copolymer) is added 3.26 grams of 2-amino-6,8-naphthalene disulfonic acid, as the mono-potassium salt, and about 12.5 grams of aminomethylphosphonic acid (AMPA). This admixture (about 236 grams total) would be placed in a 300 ml-Parr reactor, which reactor would then purged with nitrogen, closed, heated to 138° C., and held at 138° C. for five and one/half hours. The polymer of a sample of the resultant reaction mixture, after cooling, would provide a polymer reasonably commensurate to that of Example 48 above as to its weight average molecular weight, polydispersity, extent and distribution of pendant fluorescent groups and mer units of acrylic acid, salt, acrylamide and the salt of phosphonomethylacrylamide with mole percentages of about 75, 13, and 12 respectively.

The present invention is a method of preparing a polymer having pendant fluorescent groups comprising:

admixing an aqueous solution or water-in-oil latex of a polymer having mer units of Formula II

Formula II wherein R is —OR' or —NH$_2$, R' hydrogen or a substituent other than hydrogen, R$_1$, R$_2$ and R$_3$ are independently hydrogen or a substituent other than hydrogen, and R$_4$ is C$_n$H$_{2n}$ wherein n is zero or an integer of from 1 to about 10, and salts thereof and mixtures and combinations thereof, with an amine-containing organic fluorescent composition of the Formula III

Formula III wherein one of R$_5$ and R$_6$ may be hydrogen, and wherein within at least one of R$_5$ and R$_6$, or within R$_5$ and R$_6$ taken together, is an organic fluorescent group wherein the organic fluorescent group includes a polynuclear aromatic ring system, and accomplishing a degree of (trans)amidation derivatization of the polymer by heating the admixture for a sufficient period of time, and wherein a second amine-containing post-polymerization derivatization agent other than the organic fluorescent composition of Formula III is added to the admixture or to at least a portion of the reaction product of the (trans)amidation derivatization, and is heated therewith to accomplish a degree of sequential or simultaneous post-polymerization derivatization with the second amine-containinng post-polymerization derivatization agent.

In preferred embodiment the second amine-containing post-polymerization derivatization agent is a sulfoalkylation or phosphonoalkylation post-polymerization derivatization agent.

In preferred embodiments the reaction product and/or the admixture are heated in a closed vessel at a temperature of from about 120° to about 200° C. to accomplish the degree of (trans)amidation derivatization and the degree of the sequential or simultaneous post-polymerization derivatization. The reaction product and/or the admixture contains at least 10 weight percent of the polymer. The amine-containing organic fluorescent composition is admixed with the polymer in an amount of at least 0.01 weight percent based on total weight of the polymer. The (trans)amidation derivatization of the polymer is accomplished to the degree of incorporating into the polymer at least 0.01 weight percent of the amine-containing organic fluorescent composition. The sequential or simultaneous post-polymerization derivatization is accomplished to the degree of incorporating into the polymer at least 1 mole percent of the second amine-containing post-polymerization derivatization agent based on total moles of mer units in the polymer.

In other preferred embodiments, the sequential or simultaneous post-polymerization derivatization is accomplished to the degree of incorporating into the polymer at least 3 mole percent of the second amine-containing post-polymerization derivatization agent based on total moles of mer units in the polymer. The amine-containing organic fluorescent composition contains a primary amine. The second amine-containing post-polymerization derivatization agent contains a primary amine.

In further preferred embodiments, the reaction product and/or the admixture has a pH of from about 3 to about 11. The reaction product and/or the admixture is heated for a time period of from about 1 to about 8 hours. The admixture is an aqueous solution of the polymer at a concentration of the polymer of from about 30 to about 45 weight percent, and the polymer has a weight average molecular weight of up to 100,000. The admixture is a water-in-oil latex of the polymer and the polymer has a weight average molecular weight of at least 200,000. The polymer contains at least 10 mole percent, and more preferably at least 50 mole percent, of the mer units of the Formula II. The mer units are units of acrylic acid, acrylamide, salts thereof, or combinations thereof. The aromatic ring system contains sulfonic acid, carboxylic acid, salts thereof, or a plurality thereof substituent(s). The aromatic ring system is a naphthalene ring system having from 0 to 3 sulfonic acid substituents or salts thereof. The second post-polymerization derivatization agent is taurine, aminomethylphosphonic acid or water soluble salts thereof.

Unless expressly indicated otherwise herein, the inclusion of a prefix or suffix in parenthesis designates the word with such prefix or suffix as an alternative. For instance, "(trans)amidation" means "amidation and/or transamidation", "substituent(s)" means "substituent and/or substituents", and the like.

As discussed above, the successfully tagged polymers may be distinguished from unreacted derivatizing agent because these species have different fluorescent spectra, that is, different excitation/emission wavelengths at major peaks. In addition, it has been determined that the wavelengths of major absorption peaks are not dependent upon pH, that is, do not change when varying the pH from about 3 to greater than 5, while easily detectable shifts in the major absorption peaks occurs in the fluorescent derivatizing agent subjected to such a pH variation, and hence monitoring major peak excitation/emission wavelengths while so varying the pH of the medium in which the polymer and/or agent is disposed is another technique available for distinguishing these species.

Industrial Applicability of the Invention

The present invention is applicable to any industry employing polymers, particularly water soluble polymers, wherein it is desired at times to have at least some of such polymer tagged with fluorescent groups for monitoring purposes, such as the water treatment industry.

We claim:

1. A method of preparing a polymer having pendant fluorescent groups comprising:
admixing an aqueous solution or water-in-oil latex of a polymer having mer units of Formula II

wherein R is —OR' or —NH$_2$, R' hydrogen or a substituent other than hydrogen, R$_1$, R$_2$ and R$_3$ are independently hydrogen or a substituent other than hydrogen, and R$_4$ is C$_n$H$_{2n}$ wherein n is zero or an integer of from 1 to about 10, and salts thereof and mixtures and combinations thereof,
with an amine-containing organic fluorescent composition of the Formula III

wherein one of R$_5$ and R$_6$ may be hydrogen, and wherein within at least one of R$_5$ and R$_6$, or within R$_5$ and R$_6$ taken together, is an organic fluorescent group wherein said organic fluorescent group includes a polynuclear aromatic ring system, and accomplishing a degree of (trans)amidation derivatization of said polymer by heating said admixture for a sufficient period of time, and
wherein a second amine-containing post-polymerization derivatization agent other than said organic fluorescent composition of Formula III is added to said admixture or to at least a portion of the reaction product of said (trans)amidation derivatization, and is heated therewith to accomplish a degree of sequential or simultaneous post-polymerization derivatization with said second amine-containing post-polymerization derivatization agent.

2. The method of claim 1 wherein said second amine-containing post-polymerization derivatization agent is a sulfoalkylation or phosphonoalkylation post-polymerization derivatization agent.

3. The method of claim 1 wherein said reaction product and/or said admixture are heated in a closed vessel at a temperature of from about 120° to about 200° C. to accomplish said degree of (trans)amidation derivatization and said degree of said sequential or simultaneous post-polymerization derivatization.

4. The method of claim 1 wherein said reaction product and/or said admixture contains at least 10 weight percent of said polymer.

5. The method of claim 1 wherein said amine-containing organic fluorescent composition is admixed with said polymer in an amount of at least 0.01 weight percent based on total weight of said polymer.

6. The method of claim 1 wherein said (trans)amidation derivatization of said polymer is accomplished to the degree of incorporating into said polymer at least 0.01 weight percent of said amine-containing organic fluorescent composition.

7. The method of claim 1 wherein said sequential or simultaneous post-polymerization derivatization is accomplished to the degree of incorporating into said polymer at least 1 mole percent of said second amine-containing post-polymerization derivatization agent based on total moles of mer units in said polymer.

8. The method of claim 1 wherein said sequential or simultaneous post-polymerization derivatization is accomplished to the degree of incorporating into said polymer at least 3 mole percent of said second amine-containing post-polymerization derivatization agent based on total moles of mer units in said polymer.

9. The method of claim 1 wherein said amine-containing organic fluorescent composition contains a primary amine.

10. The method of claim 1 wherein said second amine-containing post-polymerization derivatization agent contains a primary amine.

11. The method of claim 1 wherein said reaction product and/or said admixture has a pH of from about 3 to about 11.

12. The method of claim 1 wherein said reaction product and/or said admixture is heated for a time period of from about 1 to about 8 hours.

13. The method of claim 1 wherein said admixture is an aqueous solution of said polymer at a concentration of said polymer of from about 30 to about 45 weight percent, and said polymer has a weight average molecular weight of up to 100,000.

14. The method of claim 1 wherein said admixture is a water-in-oil latex of said polymer and said polymer has a weight average molecular weight of at least 200,000.

15. The method of claim 11 wherein said polymer contains at least 10 mole percent of said mer units of said Formula II.

16. The method of claim 11 wherein said polymer contains at least 50 mole percent of said mer units of said Formula II.

17. The method of claim 11 wherein said mer units are units of acrylic acid, acrylamide, salts thereof, or combinations thereof.

18. The method of claim 1 wherein said aromatic ring system contains sulfonic acid, carboxylic acid, salts thereof, or a plurality thereof substituent(s).

19. The method of claim 1 wherein said aromatic ring system is a naphthalene ring system having from 0 to 3 sulfonic acid substituents or salts thereof.

20. The method of claim 2 wherein said second post-polymerization derivatization agent is taurine, aminomethylphosphonic acid or water soluble salts thereof.

* * * * *